Figure 5:
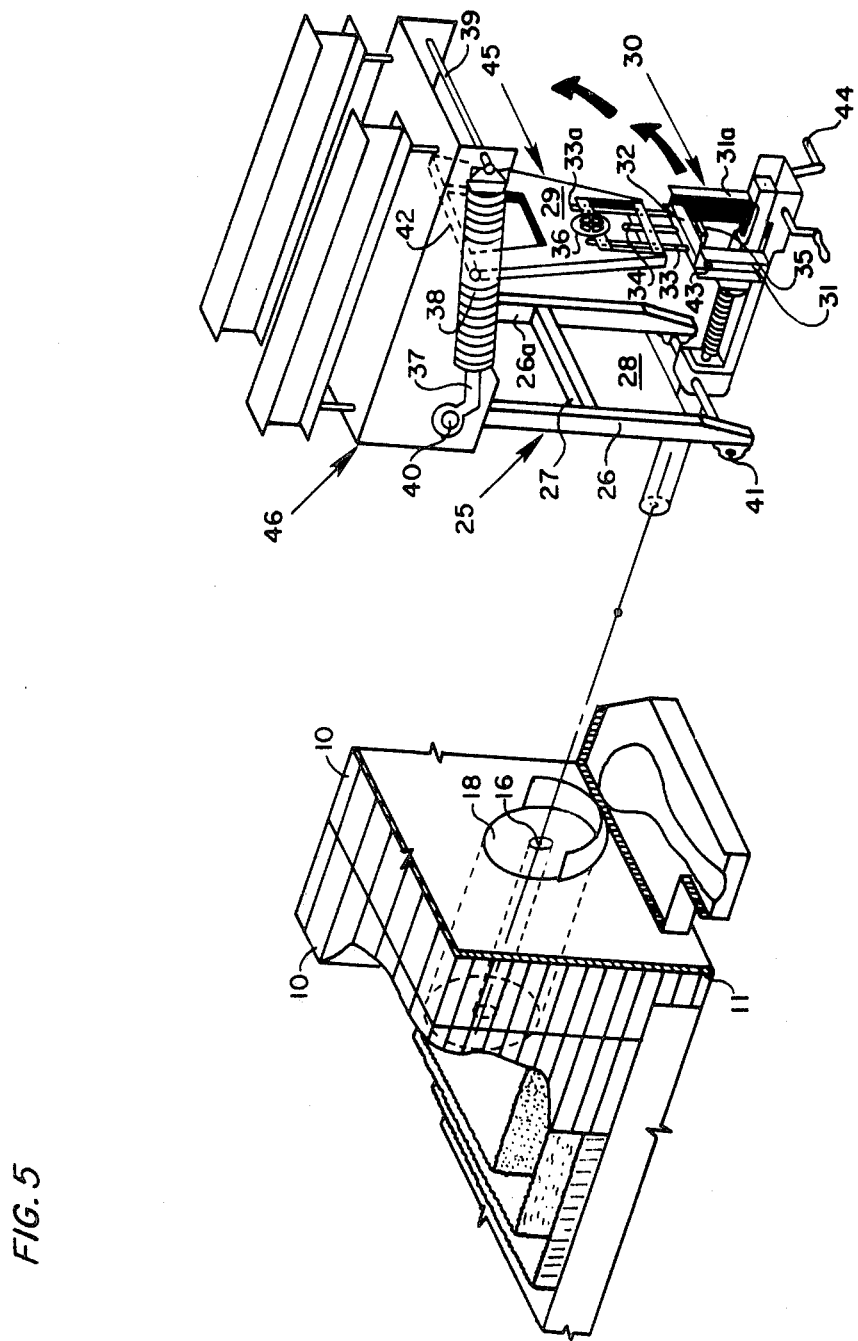

United States Patent [19]

Tarum et al.

[11] 4,220,317
[45] Sep. 2, 1980

[54] METHOD OF OPENING TAPHOLES IN A PHOSPHORUS FURNACE

[75] Inventors: Arden V. Tarum, Beaverton, Oreg.; Gordon H. Scherbel, Pocatello, Id.

[73] Assignee: FMC Corporation, Philadelphia, Pa.

[21] Appl. No.: 950,774

[22] Filed: Oct. 12, 1978

[51] Int. Cl.[2] .............................................. C21B 7/12
[52] U.S. Cl. ........................................ 266/45; 266/271
[58] Field of Search ................................... 266/45, 271

[56] References Cited

U.S. PATENT DOCUMENTS

| | | | |
|---|---|---|---|
| 1,730,678 | 10/1929 | Newton | 266/271 |
| 2,336,819 | 12/1943 | Turechek | 266/271 X |
| 3,201,225 | 8/1965 | Haynes | 266/271 |
| 3,450,399 | 6/1969 | Resch et al. | 266/271 |
| 3,549,141 | 12/1970 | Zimmerman et al. | 266/271 |
| 3,599,953 | 8/1971 | Smith | 266/45 |
| 4,030,709 | 6/1977 | Shepard et al. | 266/45 |
| 4,116,421 | 9/1978 | Rowe | 266/45 |

OTHER PUBLICATIONS

Winchester, "Ringblaster Kiln Gun" by Winchester-Western, 275 Winchester Avenue, New Haven, Connecticut.

Primary Examiner—L. Dewayne Rutledge
Assistant Examiner—Peter K. Skiff
Attorney, Agent, or Firm—Robert W. Kell; Frank Ianno

[57] ABSTRACT

A method of opening tapholes in a phosphorus furnace through which molten slag and metal are periodically removed comprises shooting one or more slugs into the taphole to fracture and break out the solidified material.

5 Claims, 5 Drawing Figures

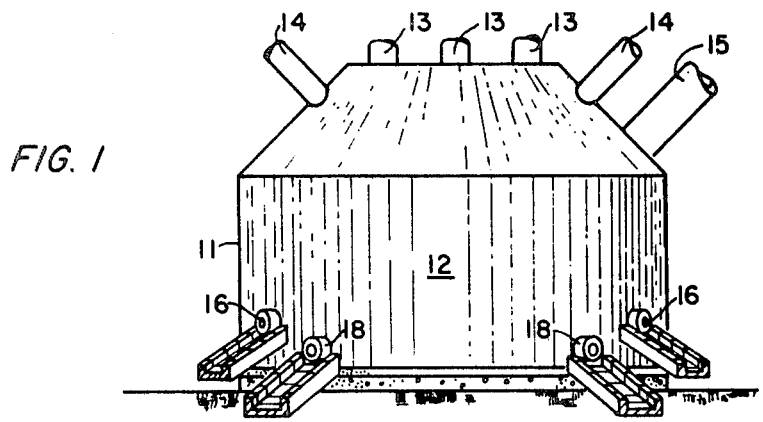
FIG. 1
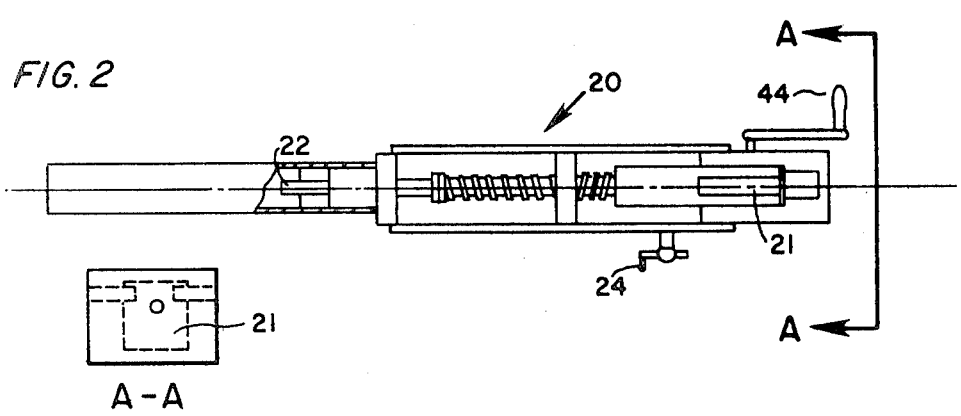
FIG. 2
A-A
FIG. 3
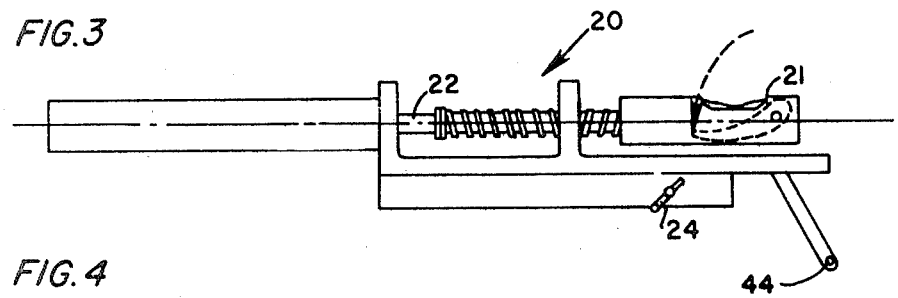
FIG. 4

METHOD OF OPENING TAPHOLES IN A PHOSPHORUS FURNACE

This invention pertains to phosphorus furnaces and more particularly to improvements in tapping procedures.

Elemental phosphorus is produced by melting and reacting in a submerged arc electric furnace a mixture of phosphate ore, a carbon reductant such as coke and a flux such as silica rock. Phosphorus vapor is liberated from the melt, collected overhead and condensed to liquid form. After the reaction is completed, the residual molten materials, separated by density into slag and ferrophos metal, are periodically drained through tapholes which are the outer openings of boretubes situated in the furnace walls. The molten streams are conveyed to cooling and disposal areas.

Tapping of phosphorus furnaces must be done as frequently as may be required to prevent an excessive slag accumulation. In one operation, for example, the tapholes must be opened approximately every 30 minutes. The ferrophos metal taps are usually not made as frequently as the ones to remove slag, and for example may be made only once every 8 hours.

Tapping of phosphorus furnaces is a difficult and onerous operation owing to the high temperature (up to about 2800° F. or 1538° C.) and erosive nature of the molten material and attendant fumes. Although explosives have been used to open tapholes in metallurgical furnaces and the silicon metal industry uses shot guns to open their relatively large and shallow tapholes such methods have not been used to open the boretubes of a phosphorus furnace which are about 125–130 cm in length and 7–9 cm in diameter.

Phosphorus furnaces have been tapped by using pneumatic rotary drills to break through hardened clay tap plugs and solidified material and allow the molten furnace contents to drain. Another known method of opening taps in a phosphorus furnace includes the use of an oxygen lance to burn out the solidified material. A further known method is to partially drill the hole and then complete the tapping using an oxygen lance.

An oxygen lance is a section of metal pipe through which is passed a stream of oxygen. On contact with an ignition source, the pipe end becomes incandescent by combusting with the oxygen to form a tip of deflagrating metal which burns out the clay plug, allowing the molten material to drain from the furnace. During this operation as many as 6 to 8 lengths of pipe section may be destroyed before the hole is completed, and in addition the carbon sleeve through which the tap is made is severely worn. As a result of this type of wear, the carbon sleeves must commonly be replaced every 4 to 6 months.

After the taphole is open and drainage is completed, the furnace opening may be closed with a fresh clay plug. Such clay plugs are fabricated in a mud mill situated on the plant premises. Furnace tapholes may also be closed by inserting green wooden plugs as described in U.S. Pat. No. 3,599,953, or by blowing particulate material such as sand into the blow tube as described in U.S. Pat. No. 4,116,421.

Although there have been improvements in the plugging of phosphorus furnace tapholes, opening a taphole continues to be a difficult and cumbersome procedure. Why this aspect of the phosphorus refining art is still relatively undeveloped can best be appreciated by considering the nature of the tapping operation. The opening of phosphorus furnace tapholes is not merely a matter of pulling a plug in the taphole opening to permit the flow of molten furnace material; that is to say, the situation is not akin to removing the stopper from the side of a water jug to drain off some of the water.

When a plug or sand is placed in a furnace taphole, the flow of molten material is blocked. However, the molten material in contact with the face of the plug or sand commences to solidify due to heat loss through the plug. Eventually, that section of the boretube between the plug and inner opening is filled with solidified furnace material and it is this congealed substance which seals the furnace taphole.

Tapping a phosphorus furnace is an uncertain procedure because the depth of the solidified material behind the plug varies and since it is carried out in close proximity to the tap openings, the job can be hazardous. This is particularly true of ferrophos taps since the molten metal will explode upon contact with water. As pointed out above, extensive use of the oxygen lance is highly detrimental in that it causes severe erosion of the boretube which becomes enlarged and of irregular contour making subsequent tapping even more difficult; and frequent replacement of the boretube is necessary. Moreover, since the boretube is about 130 cm in length and a substantial portion behind the taphole plug is filled with solidified melt, several sections of pipe may be required to burn through the seal.

In accordance with the present invention, there is provided a method of draining molten material from a phosphorus furnace having located on its outer wall at least one taphole which is the outer opening of a boretube communicating with the furnace interior. The method comprises placing a gun so that the barrel thereof is in axial alignment with the boretube and firing at least one slug through the gun barrel into the boretube. The slug breaks out the plug and solidified material in the boretube allowing the molten material to flow out.

In carrying out the invention herein, the first step is the axial alignment of the gun barrel with the boretube. In practice this is done by mounting the gun on a carrier positioned about 2–3 meters in front of the taphole. The carrier may be moved vertically between an upper and lower position and the gun is adjusted in elevation and azimuth so that when the carrier is in its lower position the gun is aimed at the center of the taphole and the gun barrel is in axial alignment with the boretube.

In opening phosphorus furnace tapholes in accordance with this invention, the carrier is in its extreme lower position, the breech of the gun is dropped and a sighting made through the gun barrel to be certain that there is no obstruction in the barrel and that the gun is aimed at the center of the taphole. The breech is then loaded with a cartridge and placed in the firing position. The gun is fired, shooting a lead or zinc slug into the taphole to fracture and break out the solidified material. One to five (or more as required) rounds are fired at the taphole to break out the plug and frozen slag. When the solid material is broken, the molten slag flushes the debris out of the hole. If the tap is frozen for a considerable length, the debris is blown out the boretube with compressed air between rounds to restore the impact efficiency.

Opening the phosphorus furnace tapholes in accordance with the process of the invention is much easier and simpler than where opening is effected by the methods employed heretofore. Since the actual shooting is done behind a shield and the gun may be discharged from a distance with a cord attached to the firing mechanism, the operator is protected from the fire hot slag and flying debris present when an oxygen lance is used. Because no oxygen is used, the workers whose job it is to open tapholes are no longer exposed to accelerated fires and burns that could be caused by the presence of concentrated oxygen in their gloves and clothing. Also, the carbon sleeves receive less oxidation. As a consequence, the process of the invention greatly decreases the frequency of boretube replacement with reduction in operating costs and downtime.

Additional features of the invention will become apparent from the following detailed description and drawings disclosing what is presently contemplated as being the best mode of the invention.

FIG. 1 of the drawings is a side elevation of an electric phosphorus furnace.

FIG. 2 of the drawings is a plan view of a gun.

FIG. 3 of the drawings is an end view of the gun, along line A—A of FIG. 2.

FIG. 4 of the drawings is a side elevation of the gun shown in FIG. 2.

FIG. 5 of the drawings is an enlarged perspective view of an electric phosphorus furnace showing a section of the furnace wall at the boretube and a gun mounted on a carrier illustrated in its extreme lower position.

Referring to FIGS. 1 and 5 of the drawings, there is shown a phosphorus furnace indicated generally at 12 having an outer stainless steel shell 11 and lined on the inside with several courses of carbon graphite brick 10. The phosphorus furnace is heated by downwardly extending electrodes 13 and ore is fed to the furnace 12 through feed chute 14. Phosphorus and other gases escape from the interior of the furnace through a duct 15.

At a predetermined height above the bottom of the furnace a plurality of carbon sleeves 18, that extend through the furnace wall, are spaced around the furnace. The sleeves each have a central boretube 16 that serves as a taphole through which molten slag is removed and the sleeves are replaceable as they wear out.

FIGS. 2, 3 and 4 illustrate an industrial gun 20 (Winchester 8 gauge Mark I Ringblaster Kiln Gun manufactured by Winchester-Western, 275 Winchester Avenue, New Haven, Conn. 06504) suitable for use in the present invention. The gun consists of a breech block 21 designed to receive a cartridge and fitted to a barrel 22. The azimuth is adjusted by movement of a crank 24. The gun is aimed by sighting through the barrel after the breech block has been moved out of the line of sight. The gun is fired by conventional firing means, not shown.

As best shown in FIG. 5, the gun 20 is mounted on a carrier generally shown at 25. The carrier is symmetrical in construction and is fabricated with two forward members 26 and 26a which support the barrel of the gun and are illustrated in FIG. 4 in their extreme downward position. A brace 27 extends between the two forward members and the entire assembly is welded to a steel plate 28 which functions as a shield and improves the rigidity of the structure.

A rear section of the carrier, shown generally at 45, consists of a steel plate 29 connected to a yoke, shown generally at 30, which supports the breech of the gun.

The yoke is constructed with parallel members 31 and 31a and cross member 32. Rods 33 and 33a which extend from the cross member 32 are slidably received by the plate 29 and permit relative movement between this plate and the yoke 30.

The lower end of the plate 29 is tapped to receive the threads of a shaft 34 which passes through an opening in cross member 32 sized to permit free movement of this shaft with respect to said cross member. The cross member bears on a wheel 35 integral with the shaft which may be rotated to adjust the distance between the plate and the yoke, thereby facilitating leveling the gun when in its downward position. A locking wheel 36 is located on the plate 29 near rods 33 and 33a and functions as a screw clamp to lock rods 33 and 33a in a fixed position with respect to the plate 29, thereby preventing relative movement between this plate and the yoke.

To complete the description of the carrier, a piston rod 37 is received within one end of a cylinder 38, the other end of which pivots on axle 39. That end of the piston rod 37 most remote from the cylinder forms an angle with the axis of the cylinder and is integral with the forward member 26. A duplicate piston rod and cylinder (not shown) is positioned behind and parallel with the piston rod 37 and cylinder 38. The duplicate piston rod is similarly integral with the forward member 26a and one end of the duplicate cylinder pivots on axel 39. Air may be admitted into cylinder 38 and its duplicate simultaneously and both the piston 37 and its counterpart will operate in unison. The carrier 25 is mounted for rotation about the axles 40, 41, 42 and 43 so that when air pressure is applied to cylinder 38 and its counterpart the piston rod 37 and its counterpart move toward the axle 39 and the carrier and gun swing upward in the direction of the arrow and out of the way.

As an example of opening a phosphorus furnace taphole by the process of the invention, the locking wheel 36 is rotated to release rods 33 and 33a and the hydraulic cylinder 38 and its counterpart are actuated to rotate the carrier about the axles 40, 41, 42 and 43 to its extreme lower position shown in FIG. 5. The gun 20 is leveled by rotation of the wheel 35 and locked in the level position with the locking wheel 36. The breach block 21 is moved downwardly in an arc as shown by the dotted lines in FIG. 4 out of the line of sight and the gun is aimed by sighting through the barrel; adjusting elevation with the wheel 35 and azimuth with the crank 24.

After aiming the gun on the center of the taphole a shell (Winchester 8 gauge Super X Magnum lead slug) is loaded in the breech block which is fitted to the barrel and the gun is cocked with handle 44 and fired, shooting an 85 gram slug into the boretube. The gun may be fired 5 or more times, blowing the debris out of the boretube with compressed air between shots to increase the impact, until the boretube has been cleared and the molten material drains out of the furnace. The locking wheel 36 is then released and the gun moved up and out of the way by actuating the hydraulic cylinder 38 and its counterpart.

I claim:

1. A method of opening a taphole formed by a boretube which extends through the wall of a phosphorus furnace, which comprises supporting a gun on a moveable carrier in a position above and parallel with said boretube, moving the gun and carrier downward in an arc so that the barrel of the gun is in axial alignment with the boretube and firing at least one slug through the gun barrel into the boretube.

2. The method of claim 1 wherein the gun barrel is 8 gauge.

3. The method of claim 1 wherein the slug is a lead slug.

4. The method of claim 1 wherein the slug is a zinc slug.

5. The method of claim 1 wherein the slug weighs about 85 grams.

* * * * *

UNITED STATES PATENT AND TRADEMARK OFFICE
CERTIFICATE OF CORRECTION

PATENT NO. : 4,220,317
DATED : September 2, 1980
INVENTOR(S) : Arden V. Tarum and Gordon H. Scherbel It is certified that error appears in the above—identified patent and that said Letters Patent is hereby corrected as shown below:

Column 3, line 61, "4" should read --5--.

Signed and Sealed this

Seventeenth Day of February 1981

[SEAL]

Attest:

RENE D. TEGTMEYER

Attesting Officer

Acting Commissioner of Patents and Trademarks